United States Patent
Ge et al.

(10) Patent No.: US 9,182,643 B1
(45) Date of Patent: Nov. 10, 2015

(54) DISPLAY HAVING PIXEL CIRCUITS WITH ADJUSTABLE STORAGE CAPACITORS

(71) Applicant: Apple Inc., Cupertino, CA (US)

(72) Inventors: Zhibing Ge, Sunnyvale, CA (US); Enkhamgalan Dorjgotov, San Francisco, CA (US); Cheng Chen, San Jose, CA (US); Lei Zhao, Cupertino, CA (US); Chun-Yao Huang, Cupertino, CA (US); Shih-Chang Chang, Cupertino, CA (US); Shih-Chyuan Fan Jiang, Taipei (TW)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/494,498

(22) Filed: Sep. 23, 2014

Related U.S. Application Data

(60) Provisional application No. 62/003,482, filed on May 27, 2014.

(51) Int. Cl.
  *G02F 1/1343* (2006.01)
  *G02F 1/136* (2006.01)
  *G02F 1/1368* (2006.01)
  *G02F 1/1362* (2006.01)

(52) U.S. Cl.
  CPC .......... *G02F 1/1368* (2013.01); *G02F 1/13439* (2013.01); *G02F 1/136213* (2013.01); *G02F 1/136277* (2013.01)

(58) Field of Classification Search
  CPC ............ G02F 1/1368; G02F 1/136213; G02F 1/13439; G02F 1/136277; H01L 27/1214
  See application file for complete search history.

(56) References Cited

U.S. PATENT DOCUMENTS

| | | | |
|---|---|---|---|
| 6,972,432 B1 * | 12/2005 | Furuya | G02F 1/133553 257/59 |
| 7,295,199 B2 | 11/2007 | Foo et al. | |
| 7,652,649 B2 * | 1/2010 | Huang | G02F 1/136213 345/90 |
| 7,777,820 B2 * | 8/2010 | Kim | G02F 1/136213 345/92 |
| 8,395,703 B2 | 3/2013 | Miyasaka et al. | |
| 8,730,226 B2 | 5/2014 | den Boer | |
| 8,912,994 B2 | 12/2014 | Liu | |
| 2007/0126685 A1 * | 6/2007 | Kimura | G09G 3/3688 345/96 |
| 2014/0125906 A1 | 5/2014 | Li et al. | |

OTHER PUBLICATIONS

Willem Den Boer, A Pixel Design for TFT LCDs with Variable Refresh Rates, ScanVue Technologies, Jun. 2011, 373-376, vol. 42-Issue 1, SID Symposium Digest of Technical Papers Michigan USA.

* cited by examiner

*Primary Examiner* — Donald Raleigh
(74) *Attorney, Agent, or Firm* — Treyz Law Group; G. Victor Treyz; Joseph F. Guihan

(57) ABSTRACT

A liquid crystal display may have a layer of liquid crystal material. The display may have an array of display pixel circuits. The display pixel circuits may each include a display pixel electrode that applies electric fields to a corresponding portion of the liquid crystal material. Thin-film transistor circuitry and other structures in the display pixels may control operation of the display pixels circuits. The thin-film transistor circuitry may be configured to handle operation of the display at multiple refresh rates. To accommodate multiple refresh rates, each pixel circuit may include a pair of transistors. A first transistor is used to apply data signals from a data line to the display pixel electrode. A storage capacitor is used to maintain the data signal on the electrode. The second transistor may be used to adjust the capacitance of the storage capacitor depending on the refresh rate of the display.

20 Claims, 11 Drawing Sheets

DISPLAY HAVING PIXEL CIRCUITS WITH ADJUSTABLE STORAGE CAPACITORS

This application claims the benefit of provisional patent application No. 62/003,482 filed May 27, 2014, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. In an assembled display, the layer of liquid crystal material is sandwiched between the thin-film transistor layer and the color filter layer.

The color filter layer contains an array of color filter elements such as red, blue, and green elements. The color filter layer provides the display with the ability to display color images.

The thin-film transistor layer contains an array of thin-film transistors that are used in controlling electric fields in the liquid crystal layer. An array of pixels is used to display images on the display. Each pixel contains a display pixel electrode and thin-film transistor circuitry for controlling the electric field that is produced in the liquid crystal layer by the electrode. The circuitry of each pixel contains a capacitor that is used to store data between successive image frames.

The array of pixels is loaded with data using vertical data lines. Horizontal control lines called gate lines are used in controlling the circuitry of the pixels in the array, so that pixels display the data provided on the data lines. With a typical arrangement, each gate line is associated with a respective row of pixels. A frame of image data may be displayed by asserting each of the gate lines in the display in sequence, so that rows of data can be loaded into the display pixels from the data lines.

Displays may be operated with a fixed refresh rate or a variable refresh rate. In a fixed refresh rate scheme, image frames are displayed at a fixed rate. The capacitors in the display pixels are used to store data on the pixels between frames. Leakage currents in the pixel circuits such as transistor leakage currents cause the data voltages on the pixel electrodes to decay. By sizing the capacitors in the display pixels appropriately for the known fixed refresh rate of the display, data voltage decay can be limited to a suitably small amount.

In variable refresh rate displays, the rate at which frames of data may be displayed on the display can be reduced when a rapid refresh rate is temporarily not needed. For example, when the only content that is being displayed on the display is static content, the refresh rate of the display can be reduced without changing the visual appearance of the display. Less power is consumed by a display when its refresh rate is lowered, so the use of variable refresh rate schemes allows an electronic device to reduce the display refresh rate whenever possible to conserve power.

Care must be taken, however, when sizing the capacitors in the display pixels of a variable refresh rate display. The slow refresh times that are required to support operation of a variable refresh rate display at low refresh rates may require the use of relatively large storage capacitances in the display pixels. If storage capacitances are too large, however, it may be difficult to load data into the display pixels effectively when the display is operated at a high refresh rate.

It would therefore be desirable to be able to provide improved pixel circuits for variable refresh rate displays.

SUMMARY

A display may have a color filter layer and a thin-film transistor layer. A layer of liquid crystal material may be located between the color filter layer and the thin-film transistor layer. The display may have an array of display pixel circuits. The display pixel circuits may each include a display pixel electrode that applies electric fields to a corresponding portion of the liquid crystal material.

Thin-film transistor circuitry and other structures in the display pixels may control operation of the display pixel circuits. The thin-film transistor circuitry may be configured to handle operation of the display at multiple refresh rates. To accommodate multiple refresh rates, each pixel circuit may include a pair of transistors. A first transistor is used to apply data signals from a data line to the display pixel electrode. A storage capacitor is used to maintain the data signal on the electrode. The second transistor may be used to adjust the capacitance of the storage capacitor depending on the refresh rate of the display.

Capacitors for the display pixels may be formed using layers of conductive material such as one or more metal layers and/or one or more transparent conductive layers. The metal layers may be used in forming terminals for the transistors. One of the transparent conductive layers may be used in forming fingers for the display pixel electrodes.

DETAILED DESCRIPTION

Electronic devices may include displays. The displays may be used to display images to a user. Illustrative electronic devices that may be provided with displays are shown in FIGS. 1, 2, 3, and 4.

Figure 1:
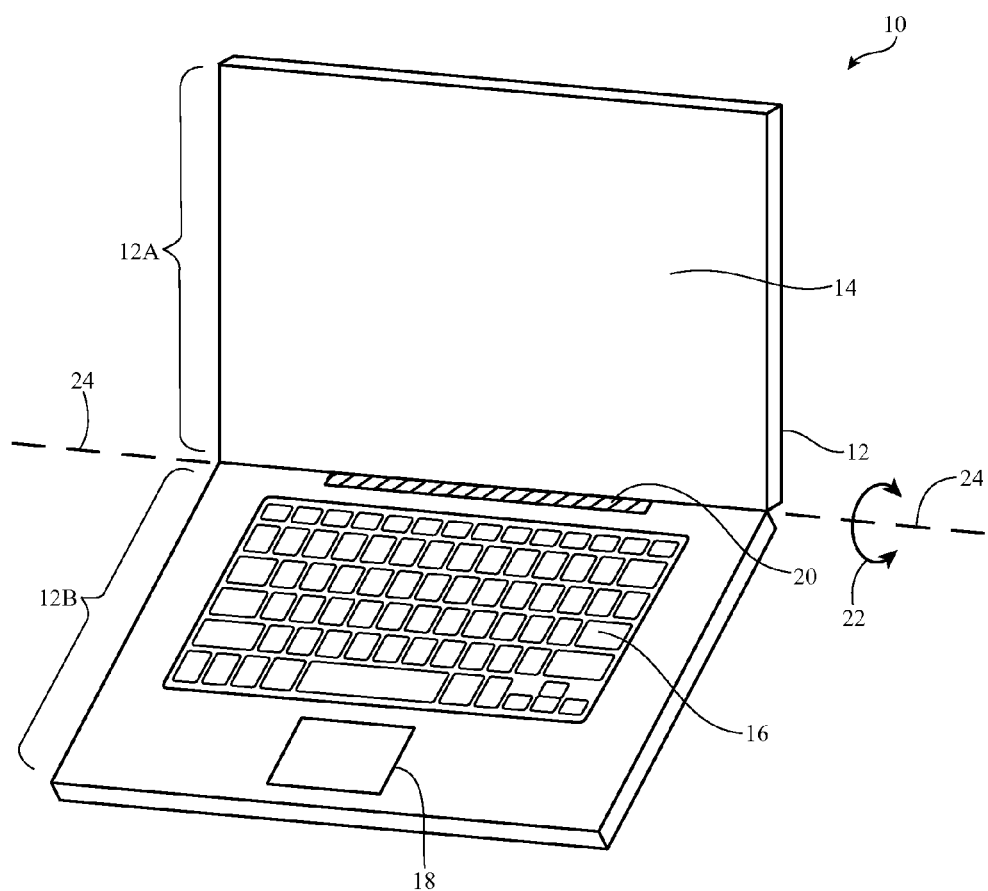
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
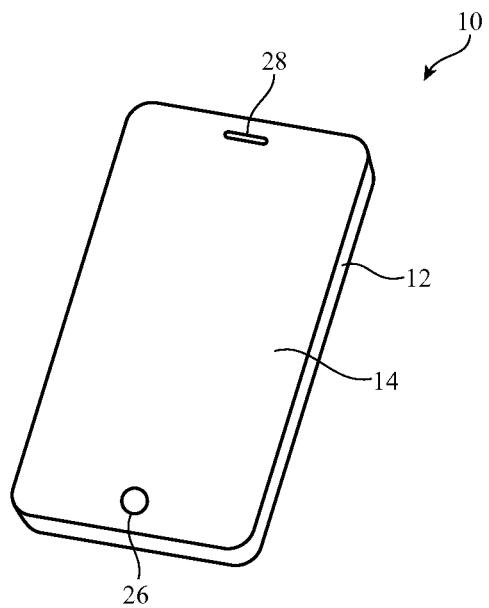
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
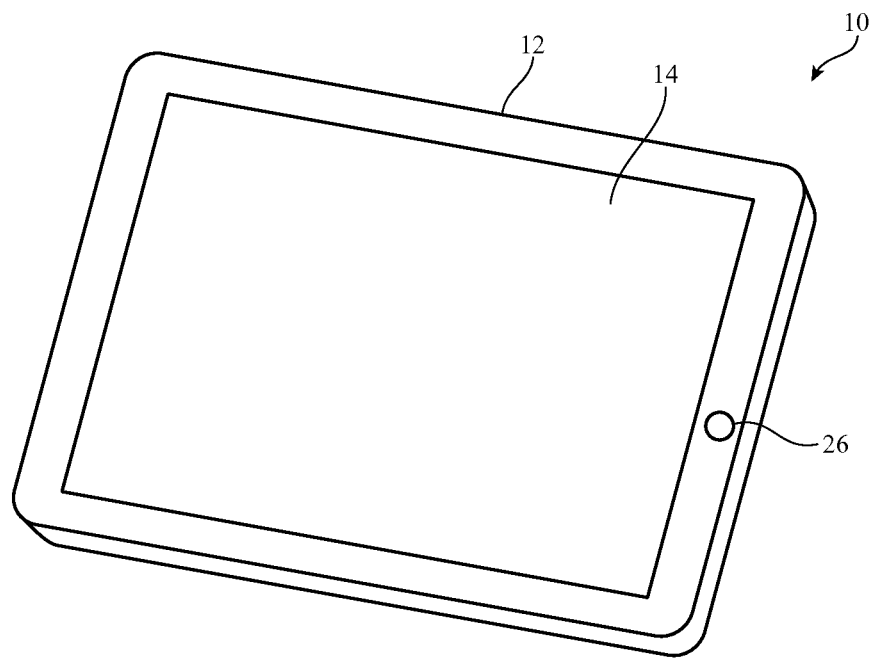
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
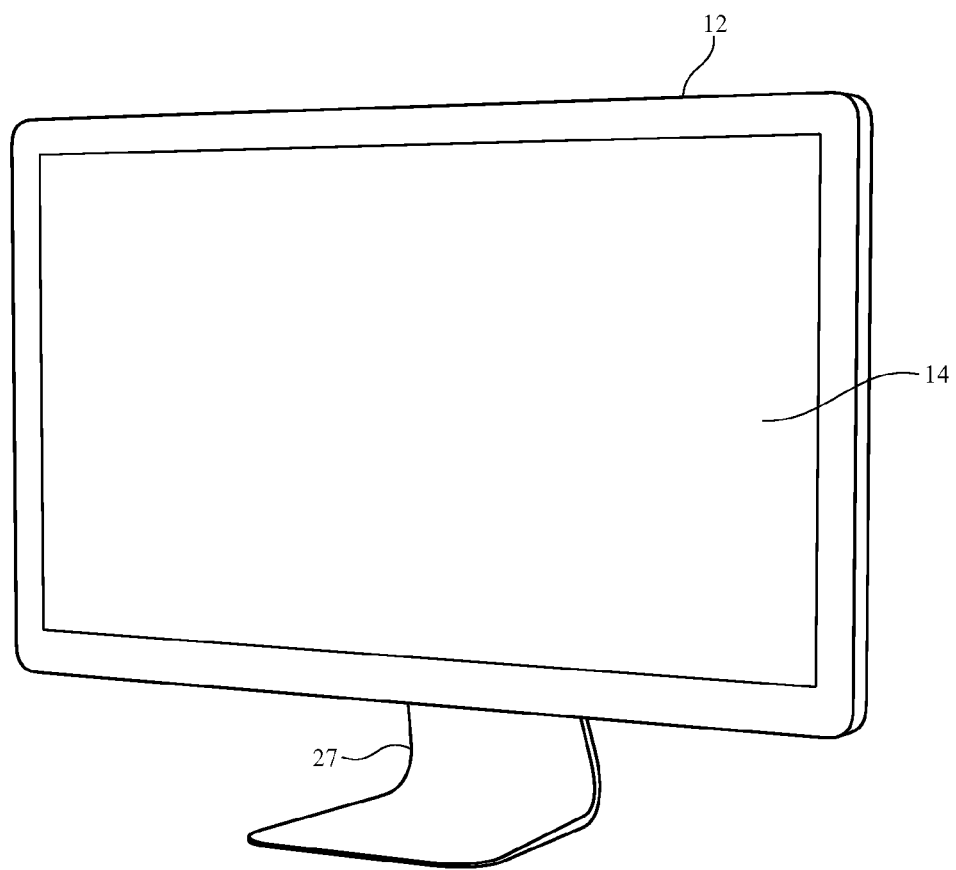
FIG. 4 is a perspective view of an illustrative electronic device such as a computer display with display structures in accordance with an embodiment.

FIG. 4 shows how electronic device 10 may be a computer display or a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
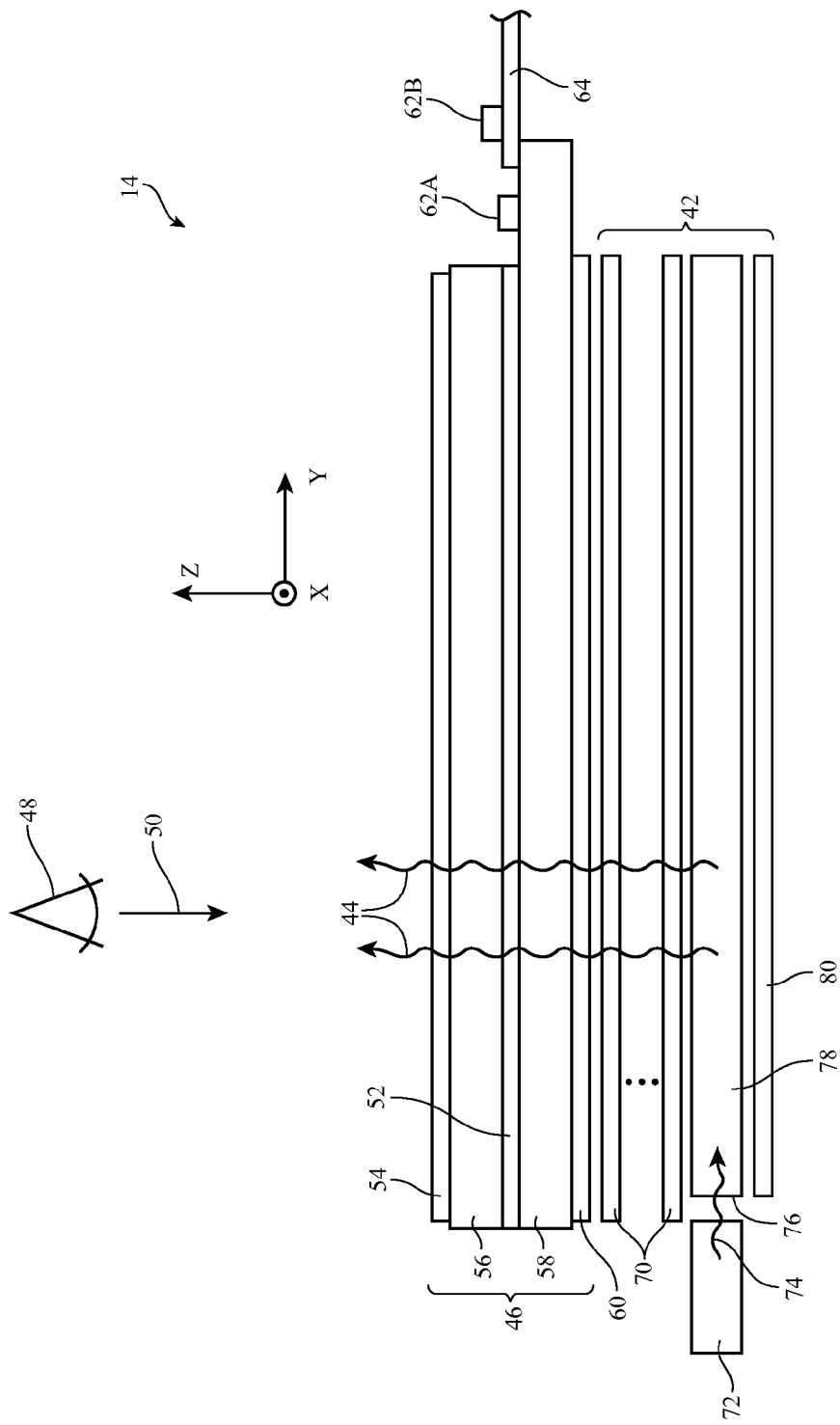
FIG. 5 is a cross-sectional side view of an illustrative display in accordance with an embodiment.

A cross-sectional side view of an illustrative configuration for display 14 of device 10 (e.g., for display 14 of the devices of FIG. 1. FIG. 2, FIG. 3. FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
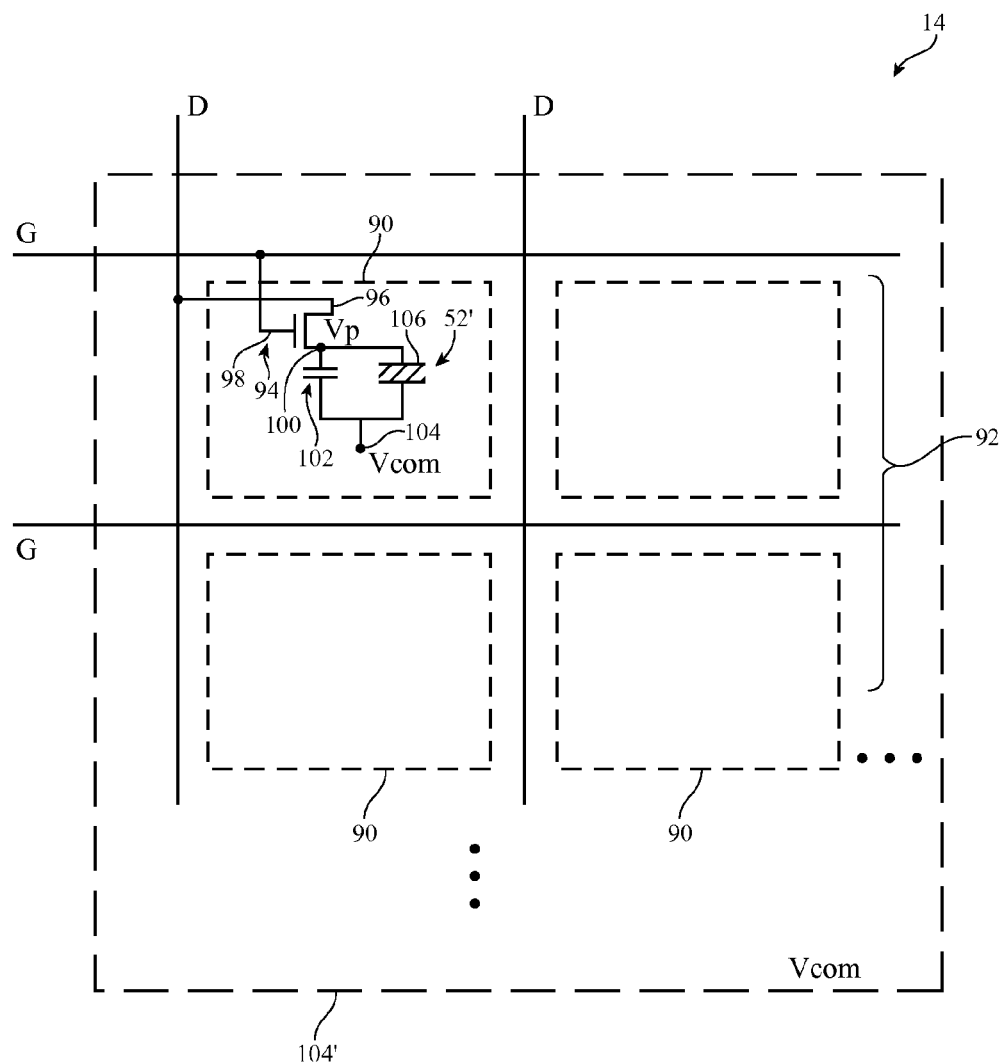
FIG. 6 is a top view of an array of display pixels in a display in accordance with an embodiment.

As shown in FIG. 6, display 14 may include a pixel array such as pixel array 92. Pixel array 92 may be controlled using control signals produced by display driver circuitry. Display driver circuitry may be implemented using one or more integrated circuits (ICs) and may sometimes be referred to as a driver IC, display driver integrated circuit, or display driver.

During operation of device 10, control circuitry in device 10 such as memory circuits, microprocessors, and other storage and processing circuitry may provide data to the display driver circuitry. The display driver circuitry may convert the data into signals for controlling the pixels of pixel array 92.

Pixel array 92 may contain rows and columns of display pixels 90. The circuitry of pixel array 92 (i.e., the rows and columns of pixel circuits for pixels 90) may be controlled using signals such as data line signals on data lines D and gate line signals on gate lines G.

Pixels 90 in pixel array 92 may contain thin-film transistor circuitry (e.g., polysilicon transistor circuitry, amorphous silicon transistor circuitry, InGaZnO transistor circuitry, other silicon or semiconducting-oxide transistor circuitry, etc.) and associated structures for producing electric fields across liquid crystal layer 52 in display 14. Each display pixel may have one or more thin-film transistors. For example, each display pixel may have a respective thin-film transistor such as thin-film transistor 94 to control the application of electric fields to a respective pixel-sized portion 52' of liquid crystal layer 52.

The thin-film transistor structures that are used in forming pixels 90 may be located on a thin-film transistor substrate such as a layer of glass. The thin-film transistor substrate and the structures of display pixels 90 that are formed on the surface of the thin-film transistor substrate collectively form thin-film transistor layer 58 (FIG. 5).

Gate driver circuitry may be used to generate gate signals on gate lines G. The gate driver circuitry may be formed from thin-film transistors on the thin-film transistor layer or may be implemented in separate integrated circuits. Gate driver circuitry may be located on both the left and right sides of pixel array 92 or on one side of pixel array 92 (as examples).

The data line signals on data lines D in pixel array 92 carry analog image data (e.g., voltages with magnitudes representing pixel brightness levels). During the process of displaying images on display 14, a display driver integrated circuit may receive digital data from control circuitry and may produce corresponding analog data signals. The analog data signals may be demultiplexed and provided to data lines D.

The data line signals on data lines D are distributed to the columns of display pixels 90 in pixel array 92. Gate line signals on gate lines G are provided to the rows of pixels 90 in pixel array 92 by associated gate driver circuitry.

The circuitry of display 14 such as demultiplexer circuitry, gate driver circuitry, and the circuitry of pixels 90 may be formed from conductive structures (e.g., metal lines and/or structures formed from transparent conductive materials such as indium tin oxide) and may include transistors such as transistor 94 that are fabricated on the thin-film transistor substrate layer of display 14. The thin-film transistors may be, for example, silicon thin-film transistors or semiconducting-oxide thin-film transistors.

As shown in FIG. 6, pixels such as pixel 90 may be located at the intersection of each gate line G and data line D in array 92. A data signal on each data line D may be supplied to terminal 96 from one of data lines D. Thin-film transistor 94 (e.g., a thin-film polysilicon transistor or an amorphous silicon transistor) may have a gate terminal such as gate 98 that receives gate line control signals on gate line signal path G. When a gate line control signal is asserted, transistor 94 will be turned on and the data signal at terminal 96 will be passed to node 100 as voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Pixel 90 may have a signal storage element such as capacitor 102 or other charge storage elements. Storage capacitor 102 may be used to store signal Vp in pixel 90 between frames (i.e., in the period of time between the assertion of successive gate signals).

Display 14 may have a common electrode coupled to node 104. The common electrode (which is sometimes referred to as the Vcom electrode) may be used to distribute a common electrode voltage such as common electrode voltage Vcom to nodes such as node 104 in each pixel 90 of array 92. As shown by illustrative electrode pattern 104' of FIG. 6. Vcom electrode 104 may be implemented using a blanket film of a transparent conductive material such as indium tin oxide and/or a layer of metal that is sufficiently thin to be transparent (e.g., electrode 104 may be formed from a layer of indium tin oxide that covers all of pixels 90 in array 92).

In each pixel 90, capacitor 102 may be coupled between nodes 100 and 104. A parallel capacitance (sometimes referred to as capacitance $C_{LC}$) arises across nodes 100 and 104 due to electrode structures in pixel 90 that are used in controlling the electric field through the liquid crystal material of the pixel (liquid crystal material 52'). As shown in FIG. 6, electrode structures 106 (e.g., a display pixel electrode with multiple fingers or other display pixel electrode for applying electric fields to liquid crystal material 52') may be coupled to node 100 (or a multi-finger display pixel electrode may be formed at node 104). The capacitance $C_{LC}$ across liquid crystal material 52' is associated with the capacitance between electrode structures 106 and common electrode Vcom at node 104. During operation, electrode structures 106 may be used to apply a controlled electric field (i.e., a field having a magnitude proportional to Vp-Vcom) across pixel-sized liquid crystal material 52' in pixel 90. Due to the presence of storage capacitor 102 and the capacitance $C_{LC}$ of material 52', the value of Vp (and therefore the associated electric field across liquid crystal material 52') may be maintained across nodes 106 and 104 for the duration of the frame.

The electric field that is produced across liquid crystal material 52' causes a change in the orientations of the liquid crystals in liquid crystal material 52'. This changes the polarization of light passing through liquid crystal material 52'. The change in polarization may, in conjunction with polarizers 60 and 54 of FIG. 5, be used in controlling the amount of light 44 that is transmitted through each pixel 90 in array 92 of display 14.

The display driver circuitry for display 14 may operate with a variable refresh rate. For example, the display driver circuitry may refresh that frames of data for display 14 at a first rate during normal operation and a second rate that is lower than the first rate when static content or other content suitable for low-refresh-rate operation is present. The normal (first) refresh rate may be 60 Hz or other suitable frequency. The second (reduced rate) refresh rate may be 1 Hz or other suitable frequency that is lower than the normal refresh rate.

When operated at 60 Hz, each pixel circuit will be loaded with fresh data once every 1/60 of a second. The capacitance between nodes 100 and 102 (e.g., the sum of capacitance 102 and capacitance $C_{LC}$ in the example of FIG. 6) should therefore be sufficiently large to hold data signal Vp at a constant value for 1/60 of a second in the presence of leakage currents in the transistors and other structures of pixel circuit 90. For example, the storage capacitance of each pixel should maintain Vp at a value that does not decrease by more than a predetermined amount from the initially loaded value of Vp). When operated at 1 Hz, there is a full second between successive frames. Unless the storage capacitance in each pixel is larger than the value selected for operation of the display at the 60 Hz refresh rate, leakage currents at 1 Hz will allow Vp to drop by more than the desired amount.

To accommodate operation at multiple refresh rates, the pixel circuits of display 14 may be provided with adjustable storage capacitors. Control circuitry in device 10 (e.g., display driver circuitry and/or other processing circuitry in device 10) may analyze display usage in real time and adjust the storage capacitor accordingly. When it is desired to conserve power and/or when static content or nearly static content is being displayed on display 14, the display driver circuitry can selectively lower the refresh rate of display 14 to conserve power and can adjust the storage capacitor to have a higher value to ensure that Vp is maintained at an acceptable level for the duration of the lengthened frame. The display driver circuitry for display 14 can also extend the length of the gate signal pulses that are applied on gate lines G when operating at the lower refresh rate. If, for example, an 8 microsecond gate line pulse are asserted on the gate lines during normal operation, the length of these gate line pulses can be extended to 25 microseconds (or other suitable time) when the storage capacitor is at its higher value and display 14 is being operated at the lower refresh rate. The lengthened gate pulses ensure that the data (voltage Vp) from data lines D will be satisfactorily loaded onto node 102, despite the presence of the enlarged storage capacitor. When normal operation is required (e.g., when normal content such as video and/or other quickly changing content is to be displayed for a user), the display driver circuitry or other circuitry in device 10 can increase the refresh rate and can adjust the storage capacitor to have a lower value that is still sufficient to ensure that the Vp will be maintained at an acceptable level for the duration of the shortened frame. An illustrative normal refresh rate for display 14 is 60 Hz. An illustrative reduced refresh rate is 1 Hz. Other normal and/or reduced refresh rates may be used if desired. The use of a 60 Hz normal refresh rate and a reduced refresh rate of 1 Hz is merely an example.

An additional thin-film transistor (i.e., a thin-film transistor in addition to data loading transistor 94 of FIG. 6) may be added to each pixel circuit to adjust the capacitance of the storage capacitor. The structures used in forming the additional thin-film transistor and one or more additional capacitors to be selectively switched into use may be implemented using one or more additional conductive layers such as one or more additional layers of indium tin oxide or other transparent conductive layers, metal layers, or other conductive layers. The conductive layers may be separated by layers of dielectric (e.g., one more additional inorganic and/or organic dielectric layers).

Figure 7:
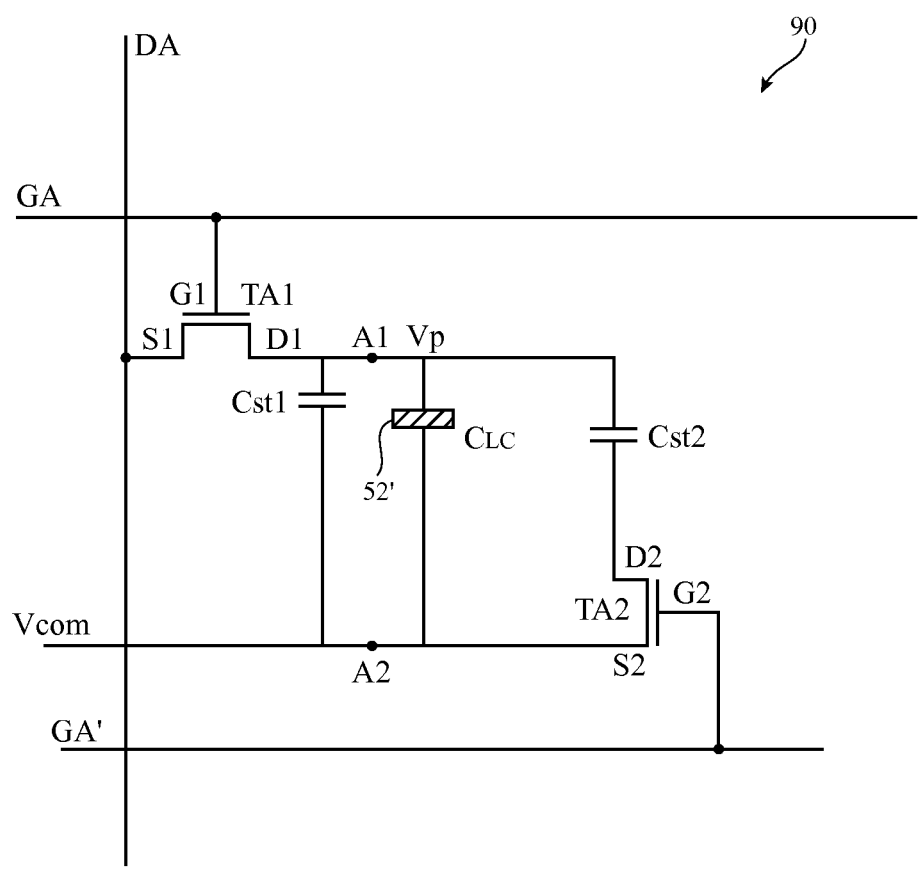
FIG. 7 is a diagram of an illustrative pixel circuit of the type that may be used in a variable refresh rate display in accordance with an embodiment.
Figure 8:
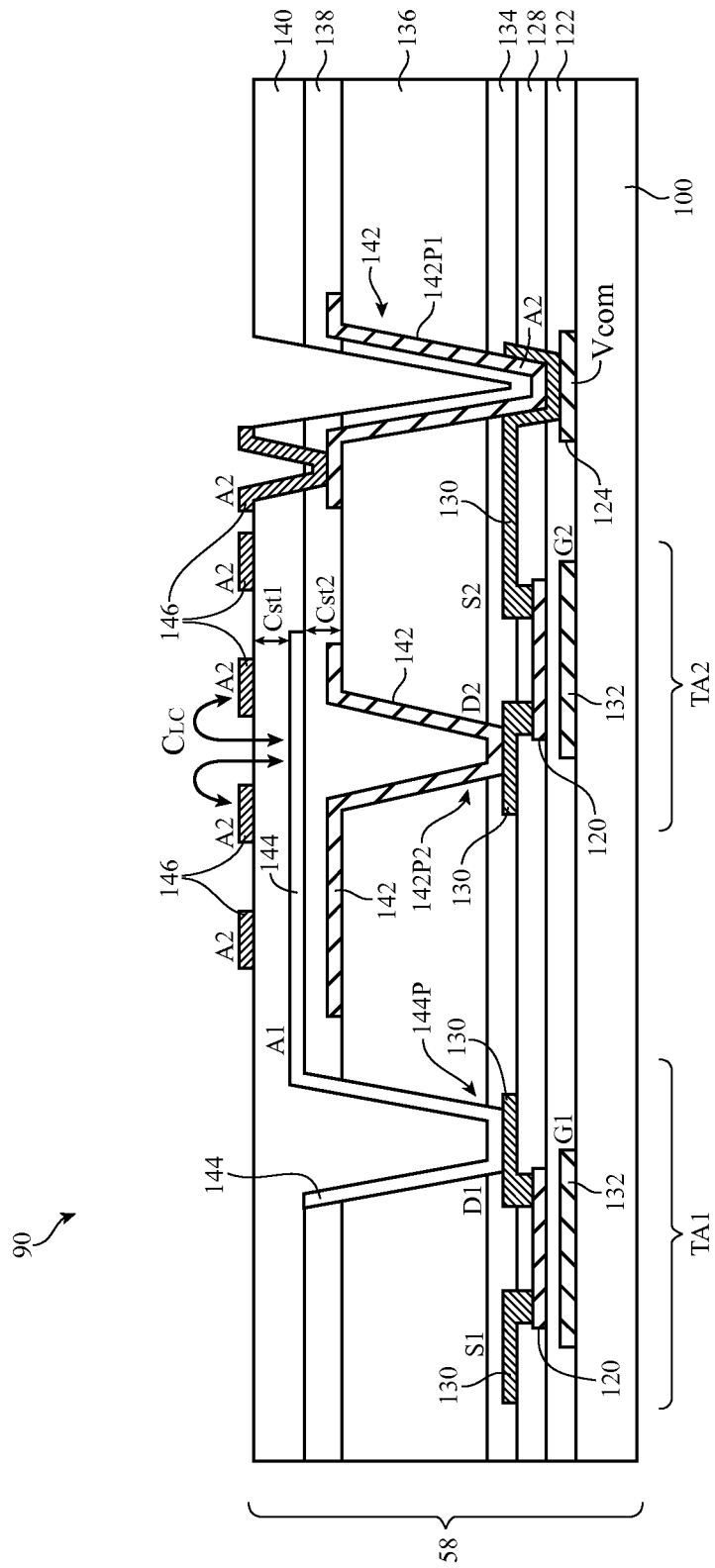
FIG. 8 is a cross-sectional side view of a portion of an illustrative display that has been used to implement structures for the pixel circuit of FIG. 7 in accordance with an embodiment.
Figure 9:
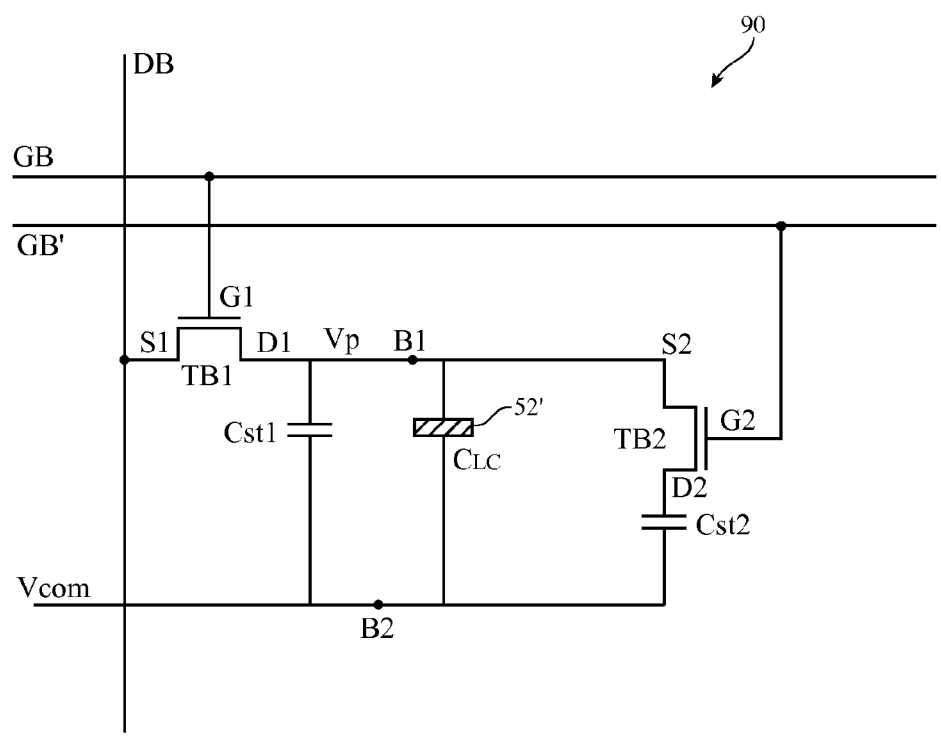
FIG. 9 is a diagram of another illustrative pixel circuit of the type that may be used in a variable refresh rate display in accordance with an embodiment.
Figure 10:
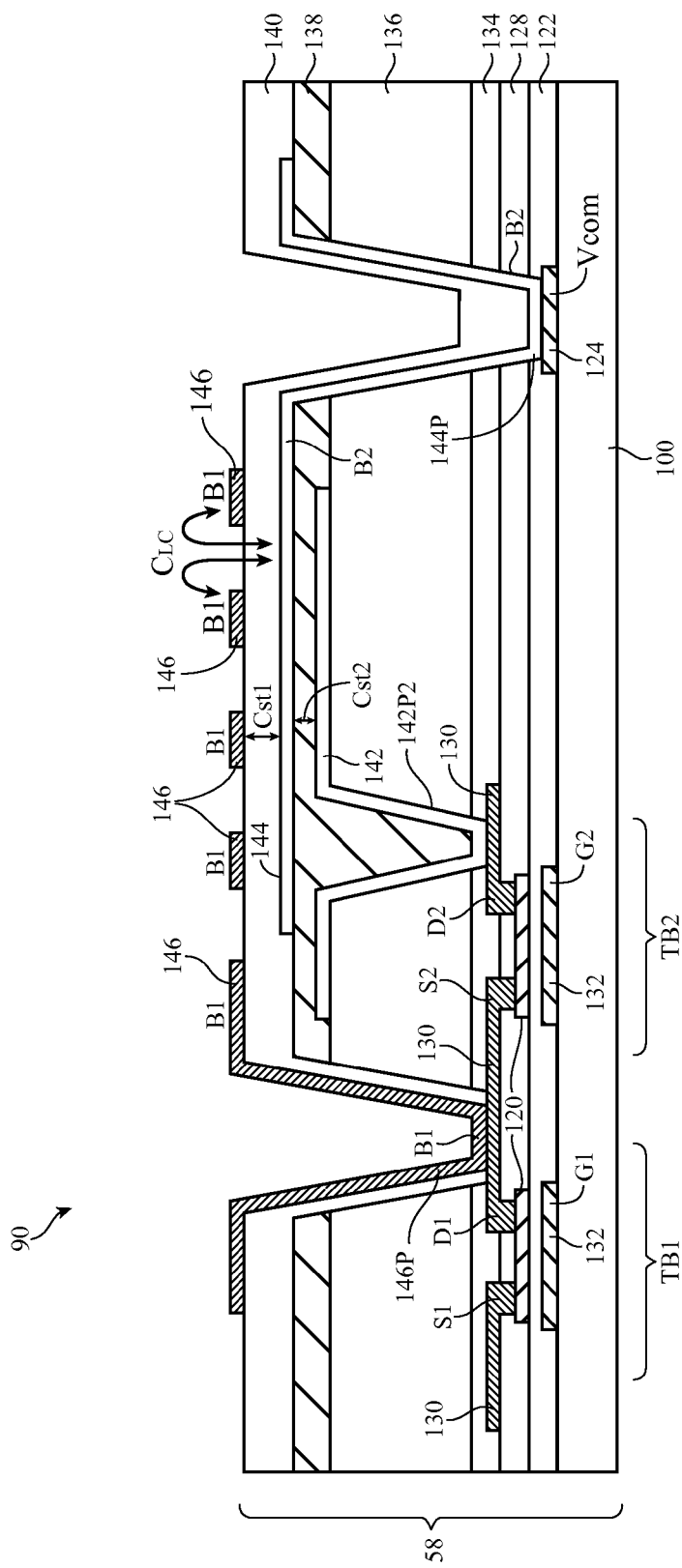
FIG. 10 is a cross-sectional side view of a portion of an illustrative display that has been used to implement structures for the pixel circuit of FIG. 9 in accordance with an embodiment.
Figure 11:
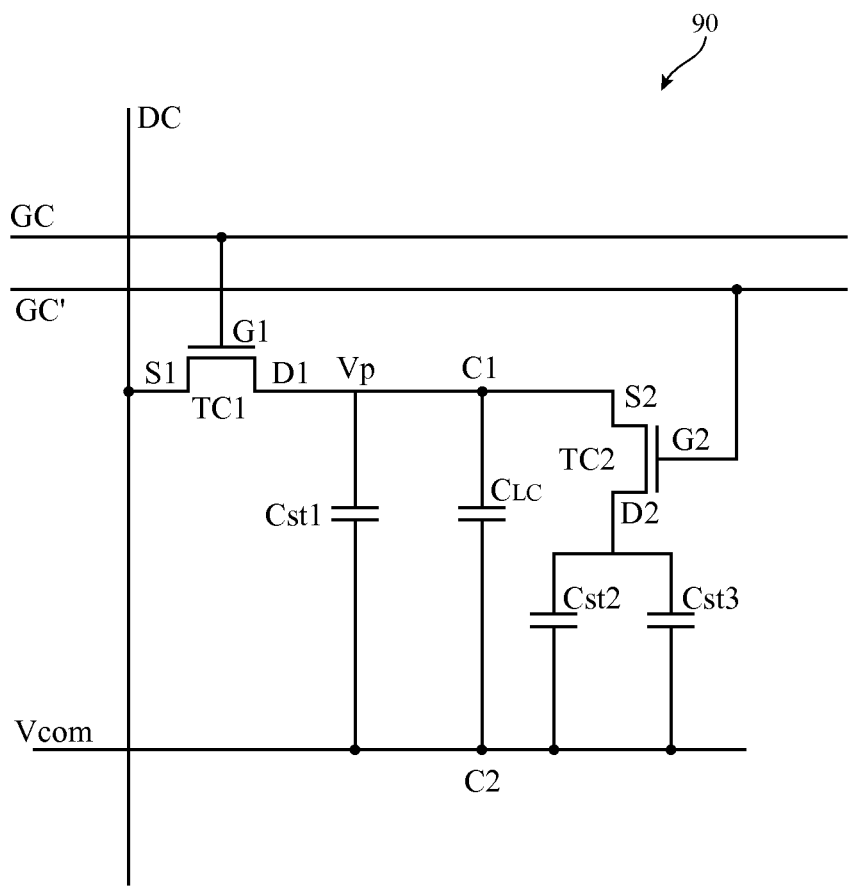
FIG. 11 is a diagram of an additional illustrative pixel circuit of the type that may be used in a variable refresh rate display in accordance with an embodiment.

Illustrative pixel circuits with adjustable storage capacitors are shown in FIGS. 7, 9, and 11. Cross-sectional side views of illustrative thin-film transistor circuitry and capacitor circuitry that may be used in implementing these pixel circuits are shown respectively in FIGS. 8, 10, and 12.

In the illustrative arrangement of FIG. 7, pixel circuit 90 has thin-film transistors TA1 and TA2. Transistor TA1 (serving as data loading transistor 94 of FIG. 6) may be used to apply a data signal Vp from data line DA to node A1. The voltage between node A1 (at voltage Vp) and common node A2 (at Vcom) is applied to liquid crystal 52'. A parasitic capacitance $C_{LC}$ is associated with liquid crystal 52'. A storage capacitance Cst is used to maintain voltage Vp on node A1 between frames. Gate line signal GA is applied to gate G1 of transistor TA1 and controls the operation of transistor TA1. When the signal on G1 is deasserted, source S1 and drain D1 are isolated from each other. When the signal on gate G1 is asserted, source S1 and drain D1 of transistor TA1 are shorted to each other and data Vp from data line DA is loaded onto node A1.

Gate line signal GA' controls the operation of transistor TA2. When GA' is deasserted on gate G2 of transistor TA2, transistor TA2 is turned off and drain D2 and source S2 are isolated from each other. In this situation, capacitor Cst2 is switched out of use and does not contribute to the overall value of the storage capacitance Cst for pixel 90 of FIG. 7 (i.e., the storage capacitance of pixel 90 will have its lower value of Cst1). This low-capacitance configuration for pixel 90 can be used whenever it is desired to operate display 14 in a normal refresh rate mode (e.g., 60 Hz).

Signal GA' on a secondary gate line may be asserted when it is desired to short drain D2 to source S2 and thereby switch capacitor Cst2 into use in parallel with capacitor Cst1. In this situation, the storage capacitance Cst for pixel 90 of FIG. 7 will have its higher value, which is equal to the sum of storage capacitor Cst and capacitor Cst2. This higher-capacitance configuration for pixel 90 can be used whenever it is desired to operate display 14 in a reduced refresh rate mode (e.g., 1 Hz).

A cross-sectional side view of illustrative structures that may be used in implementing thin-film circuitry for thin-film transistor layer 58 such as pixel circuit 90 of FIG. 7 is shown in FIG. 8. As shown in FIG. 8, thin-film transistor layer 58 may have a substrate such as substrate 100. Substrate 100 may be a layer of transparent glass, a clear plastic layer, or other substrate layer. Transistors TA1 and TA2 and capacitors Cst1 and Cst2 may be formed from dielectric layers and conductive layers deposited and patterned on substrate 100. A first metal layer 132 may be patterned to form gates G1 and G2 for transistors TA1 and TA2, respectively. Part of the first metal layer may also be used in forming Vcom electrode 124. Semiconductor channel regions for transistors TA1 and TA2 may be formed from semiconductor layer 120. Layer 120 may be a silicon layer, an InGaZnO layer or other semiconducting-oxide layer, or other suitable semiconductor layer. Gate insulator layer 122 may cover layer 132 (including Vcom electrode 124). Insulating layer 128 may be formed over semiconductor layer 120. Gate insulator layer 122 and insulating layer 128 may be formed from silicon oxide, silicon nitride, silicon oxynitride, or other inorganic dielectric. Gate insulator layer 122 and insulating layer 128 may be transparent.

Source-drain electrodes for source S1, drain D1, drain D2, and source S2 may be formed from second metal layer 130. Metal layers 132 and 130 may be formed from copper, aluminum, molybdenum, titanium, silver, other metals, and alloys of these metals.

Insulating layer 134 may cover metal layer 130. Insulating layer 134 may be a passivation layer that is formed from silicon oxide, silicon nitride, silicon oxynitride, or other dielectric. Layer 134 may be transparent.

Dielectric layer 136 may be a transparent layer that covers layer 134. Dielectric layer 136 may be an insulating organic layer (e.g., a clear polymer such as a transparent photoimageable polymer).

Openings may be formed in layer 136 and the other dielectric layers to allow indium tin oxide contacts or other conductive structures to form electrical connections to transistors TA1 and TA2 and Vcom.

Layers 138 and 140 may be passivation layers formed from dielectric such as silicon oxide, silicon nitride, silicon oxynitride, or other transparent insulating material. Layers 138 and 140 may separate layers 142, 144, and 146 from each other. Layers 142, 144, and 146 may be formed from transparent conductive materials such as indium tin oxide, indium zinc oxide, gallium-doped zinc oxide, transparent conductive carbon nanotube films, etc.

In the arrangement of FIG. 8, layers 142 and 144 form respective capacitor electrodes for capacitor Cst2 and layers 144 and 146 form respective capacitor electrodes for capacitor Cst1. Fingers of layer 146 on the upper surface of layer 140 form a display pixel electrode for pixel 90. Layer 142 has a portion such as portion 142P1 that shorts layer 146 to layer 130 and Vcom electrode 124 (and source S2 of transistor TA2). Layer 142 also has a portion such as portion 142P2 that shorts layer 142 to drain D2 of transistor TA2. Portion 144P of layer 144 contacts drain D1 of transistor TA1. Portions of metal layers 132 and 130 and other structures not shown in FIG. 8 may, if desired, be used in forming interconnects and other structures for pixel circuits such as pixel circuit 90.

In the illustrative arrangement of FIG. 9, pixel circuit 90 has thin-film transistors TB1 and TB2. Transistor TB1 (serving as data loading transistor 94 of FIG. 6) may be used to apply a data signal Vp from data line DB to node B1. The voltage between node B1 (at voltage Vp) and common node B2 (at Vcom) is applied to liquid crystal 52'. A parasitic capacitance $C_{LC}$ is associated with liquid crystal 52'. A storage capacitance Cst is used to maintain voltage Vp on node B1 between frames. Gate line signal GB is applied via a gate line to gate G1 of transistor TB1 to control the operation of transistor TB1. When the signal on G1 is deasserted, source S1 and drain D1 are isolated from each other. When the signal on gate G1 is asserted, source S1 and drain D1 of transistor TB1 are shorted to each other and data Vp from data line DB is loaded onto node B1.

Gate line signal GB' on a secondary gate line controls the operation of transistor TB2. When GB' is deasserted on gate G2 of transistor TB2, transistor TB2 is turned off and drain D2 and source S2 are isolated from each other. In this situation, capacitor Cst2 is switched out of use and does not contribute to the overall value of the storage capacitance Cst for pixel 90 of FIG. 9 (i.e., the storage capacitance of pixel 90 will have its lower value of Cst1). This low-capacitance configuration for pixel 90 can be used whenever it is desired to operate display 14 in a normal refresh rate mode (e.g., 60 Hz).

Signal GB' may be asserted when it is desired to short drain D2 to source S2 and thereby switch capacitor Cst2 into use in parallel with capacitor Cst1. In this situation, the storage capacitance for pixel 90 of FIG. 9 will have its higher value, which is equal to the sum of storage capacitor Cst1 and capacitor Cst2. This higher-capacitance configuration for pixel 90 can be used whenever it is desired to operate display 14 in a reduced refresh rate mode (e.g., 1 Hz).

A cross-sectional side view of illustrative structures that may be used in implementing thin-film circuitry for thin-film transistor layer 58 such as pixel circuit 90 of FIG. 9 is shown in FIG. 10. As shown in FIG. 10, thin-film transistor layer 58 may have a substrate such as substrate 100. Substrate 100 may be a layer of transparent glass, a clear plastic layer, or other substrate layer. Transistors TB1 and TB2 and capacitors Cst1 and Cst2 may be formed from dielectric layers and conductive layers deposited and patterned on substrate 100. A first metal layer 132 may be patterned to form gates G1 and G2 for transistors TB1 and TB2, respectively. Part of the first metal layer may also be used in forming Vcom electrode 124. Semiconductor channel regions for transistors TB1 and TB2 may be formed from semiconductor layer 120. Layer 120 may be a silicon layer, an InGaZnO layer or other semiconducting oxide layer, or other suitable semiconductor layer. Gate insulator layer 122 may cover layer 132 (including Vcom electrode 124). Insulating layer 128 may be formed over semiconductor layer 120. Gate insulator layer 122 and insulating layer 128 may be formed from silicon oxide, silicon nitride, silicon oxynitride, or other inorganic dielectric. Gate insulator layer 122 and insulating layer 128 may be transparent.

Source-drain contacts for source S1, drain D1, drain D2, and source S2 may be formed from second metal layer 130. Metal layers 132 and 130 may be formed from copper, aluminum, molybdenum, titanium, silver, other metals, and alloys of these metals.

Insulating layer 134 may cover metal layer 130. Insulating layer 134 may be a passivation layer that is formed from silicon oxide, silicon nitride, silicon oxynitride, or other dielectric. Layer 134 may be transparent.

Dielectric layer 136 may be a transparent layer that covers layer 134. Dielectric layer 136 may be an insulating organic layer (e.g., a clear polymer such as a transparent photoimageable polymer).

Openings may be formed in layer 136 to allow indium tin oxide contacts or other conductive structures to form electrical connections to transistors TB and TB2 and Vcom.

Layers 138 and 140 may be passivation layers formed from dielectric such as silicon oxide, silicon nitride, silicon oxynitride, or other transparent insulating material. Layers 138 and 140 may separate layers 142, 144, and 146 from each other. Layers 142, 144, and 146 may be formed from transparent conductive materials such as indium tin oxide, indium zinc oxide, gallium-doped zinc oxide, transparent conductive carbon nanotube films, etc.

In the arrangement of FIG. 10, layers 142 and 144 form respective capacitor electrodes for capacitor Cst2 and layers 144 and 146 form respective capacitor electrodes for capacitor Cst1. Fingers of layer 146 on the upper surface of layer 140 form a pixel electrode for pixel 90 that applies electric fields to liquid crystal 52'. Layer 142 has a portion such as portion 142P that shorts layer 142 to layer 130 and drain electrode D2 of transistor TB2. Layer 146 has a portion such as portion 146P that shorts layer 146 to drain D1 of transistor TB1. Portion 144P of layer 144 couples layer 144 to Vcom electrode 124. Portions of metal layers 132 and 130 and other structures not shown in FIG. 8 may, if desired, be used in forming interconnects and other structures for pixel circuits such as pixel circuit 90.

Another illustrative pixel circuit arrangement is shown in FIG. 11. In the illustrative arrangement of FIG. 11, pixel circuit 90 has thin-film transistors TC1 and TC2. Transistor TC1 (serving as data loading transistor 94 of FIG. 6) may be used to apply a data signal Vp from data line DC to node C1. The voltage between node C1 (at voltage Vp) and common node C2 (at Vcom) is applied to liquid crystal 52'. A parasitic capacitance $C_{LC}$ is associated with liquid crystal 52'. A storage capacitance Cst is used to maintain voltage Vp on node C1 between frames. Gate line signal GC is applied to gate G1 of transistor TC1 by a gate line and controls the operation of transistor TC1. When the signal on G1 is deasserted, source S1 and drain D1 are isolated from each other. When the signal on gate G1 is asserted, source S1 and drain D1 of transistor TB1 are shorted to each other and data Vp from data line DC is loaded onto node C1.

Gate line signal GC' controls the operation of transistor TC2. When signal GC' is deasserted on gate (G2 of transistor TC2, transistor TC2 is turned off and drain D2 and source S2 are isolated from each other. In this situation, parallel capacitors Cst2 and Cst3 are switched out of use and do not contribute to the overall value of the storage capacitance for pixel 90 of FIG. 11 (i.e., the storage capacitance of pixel 90 will have its lower value of Cst1). This low-capacitance configuration for pixel 90 can be used whenever it is desired to operate display 14 in a normal refresh rate mode (e.g., 60 Hz).

Signal GC' may be asserted when it is desired to short drain D2 to source S2 and thereby switch parallel capacitors Cst2 and Cst3 into use in parallel with capacitor Cst1. In this situation, the storage capacitance for pixel 90 of FIG. 11 will have its higher value, which is equal to the sum of storage capacitor Cst1, storage capacitor Cst2, and storage capacitor Cst3. This higher-capacitance configuration for pixel 90 can be used whenever it is desired to operate display 14 in a reduced refresh rate mode (e.g., 1 Hz).

Figure 12:
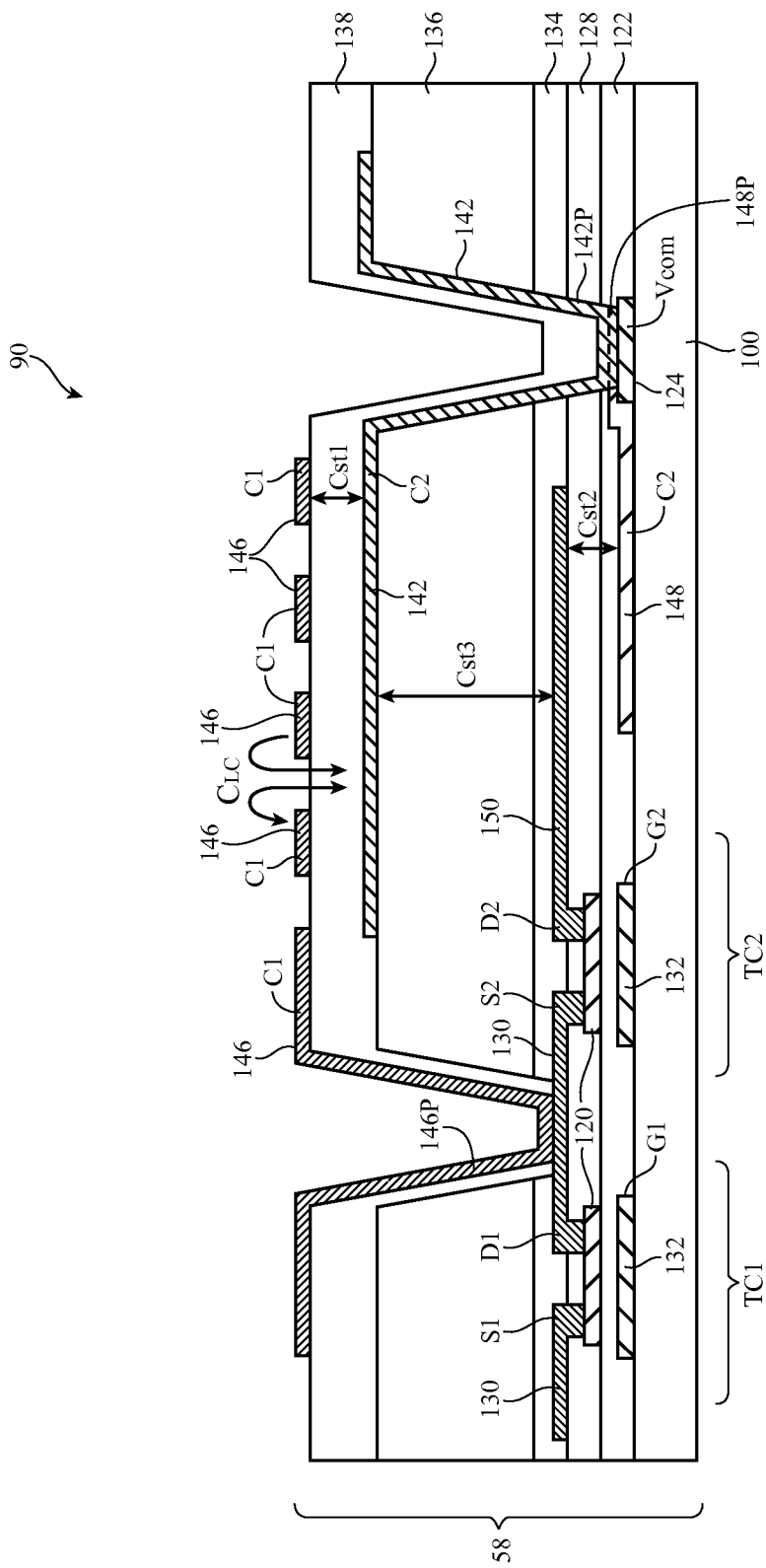
FIG. 12 is a cross-sectional side view of a portion of an illustrative display that has been used to implement structures for the pixel circuit of FIG. 11 in accordance with an embodiment.

A cross-sectional side view of illustrative structures that may be used in implementing thin-film circuitry for thin-film transistor layer 58 such as pixel circuit 90 of FIG. 11 is shown in FIG. 12. As shown in FIG. 12, thin-film transistor layer 58 may have a substrate such as substrate 100. Substrate 100 may be a layer of transparent glass, a clear plastic layer, or other substrate layer. Transistors TC1 and TC2 and capacitors Cst1, Cst2, and Cst3 may be formed from dielectric layers and conductive layers deposited and patterned on substrate 100. A first metal layer 132 may be patterned to form gates G1 and G2 for transistors TC1 and TC2, respectively. Part of the first metal layer may also be used in forming Vcom electrode 124. Conductive layer 148 may be formed on substrate 100 and may have a portion such as portion 148P that overlaps electrode 124 and is shorted to electrode 124. Semiconductor channel regions for transistors TC1 and TC2 may be formed from semiconductor layer 120. Layer 120 may be a silicon layer, an InGaZnO layer or other semiconducting oxide layer, or other suitable semiconductor layer. Gate insulator layer 122 may cover layer 132 (including Vcom electrode 124) and conductive layer 148. Insulating layer 128 may be formed over semiconductor layer 120. Transparent conductive layer 150 may be formed over layer 128. Gate insulator layer 122 and insulating layer 128 may be formed from silicon oxide, silicon nitride, silicon oxynitride, or other inorganic dielectric. Gate insulator layer 122 and insulating layer 128 may be transparent.

Source-drain contacts for source S1, drain D1, and source S2 may be formed from second metal layer 130. Drain D2 may be formed form transparent conductive layer 150. Metal layers 132 and 130 may be formed from copper, aluminum, molybdenum, titanium, silver, other metals, and alloys of these metals.

Insulating layer 134 may cover metal layer 130 and transparent conductive layer 150. Insulating layer 134 may be a passivation layer that is formed from silicon oxide, silicon nitride, silicon oxynitride, or other dielectric. Layer 134 may be transparent.

Dielectric layer 136 may be a transparent layer that covers layer 134. Dielectric layer 136 may be an insulating organic layer (e.g., a clear polymer such as a transparent photoimageable polymer). Openings may be formed in layer 136 and other dielectric layers in pixel 90 to allow indium tin oxide contacts or other conductive structures to form electrical connections to transistors TC1 and TC2 and Vcom.

Layer 138 may be a passivation layer formed from dielectric such as silicon oxide, silicon nitride, silicon oxynitride, or other transparent insulating material.

Conductive layers 150, 146, 142, and 148 may be formed from transparent conductive materials such as indium tin oxide, indium zinc oxide, gallium-doped zinc oxide, transparent conductive carbon nanotube films, etc.

In the arrangement of FIG. 12, layers 148 and 150 form respective capacitor electrodes for capacitor Cst2. Dielectric layers 122 and 128 are interposed between layers 148 and 150. Layers 150 and 142 form respective capacitor electrodes for capacitor Cst3. Dielectric layers 134 and 136 are interposed between layers 130 and 142. Layers 142 and 146 form respective capacitor electrodes for capacitor Cst1. Dielectric layer 138 is interposed between layer 142 and layer 146. Fingers of layer 146 on the upper surface of layer 138 form a pixel electrode for pixel 90. Layer 142 has a portion such as portion 142P that shorts layer 142 to layers 148 and 124. Layer 146 has a portion such as portion 146P that shorts layer 146 to drain D1 of transistor TC1. Portion 148P of layer 148 overlaps Vcom electrode 124 and contacts portion 142P of layer 142.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
an array of display pixels, each display pixel having a first transistor that is controlled to apply a data signal from a data line to a region of liquid crystal material using a display pixel electrode and each display pixel having a second transistor that adjusts a capacitance value for a storage capacitor by switching a second capacitor in and out of use in parallel with a first capacitor, each display pixel in the array comprising:
a first patterned metal layer that forms gates for the first and second transistors and a common electrode;
a semiconducting layer forming channels for the first and second transistors;
a second patterned metal layer that forms sources and drains for the first and second transistors; and
first, second, and third transparent conductive layers that form the first and second capacitors.

2. The display defined in claim 1 wherein the first and second transparent conductive layers form respective electrodes for the first capacitor.

3. The display defined in claim 2 and wherein the second and third transparent conductive layers form respective electrodes for the second capacitor.

4. The display defined in claim 3 wherein the first, second, and third transparent conductive layers comprise layers selected from the group consisting of: a layer of indium tin oxide, a layer of indium zinc oxide, a layer of gallium-doped zinc oxide, and a transparent conductive carbon nanotube layer.

5. The display defined in claim 3 wherein the first transparent conductive layer comprises indium tin oxide.

6. The display defined in claim 5 wherein the second transparent conductive layer comprises indium tin oxide.

7. The display defined in claim 6 wherein the third transparent conductive layer comprises indium tin oxide.

8. The display defined in claim 7 wherein at least some of the second transparent conductive layer is interposed between the first transparent conductive layer and the third transparent conductive layer and wherein the first transparent conductive layer is shorted to the common electrode.

9. The display defined in claim 8 wherein the first transparent conductive layer is patterned to form fingers for the display pixel electrode and wherein the semiconducting material comprises a semiconducting oxide.

10. A display, comprising:
an array of display pixels, each display pixel having a first transistor that is controlled to apply a data signal from a data line to a region of liquid crystal material using a display pixel electrode and each display pixel having a second transistor that adjusts a capacitance value for a storage capacitor by switching a second capacitor in and out of use in parallel with a first capacitor, each display pixel in the array comprising:
a first patterned metal layer that forms gates for the first and second transistors and a common electrode:
a semiconducting layer forming channels for the first and second transistors;
a second patterned metal layer that forms sources and drains for the first and second transistors; and
first, second, and third transparent conductive layers that form the first and second capacitors, wherein at least some of the second transparent conductive layer is interposed between the first and third transparent conductive layers and wherein the second transparent conductive layer is shorted to the common electrode.

11. The display defined in claim 10 wherein the first and second transparent conductive layers form respective electrodes for the first capacitor.

12. The display defined in claim 11 and wherein the second and third transparent conductive layers form respective electrodes for the second capacitor.

13. The display defined in claim 12 wherein the first, second, and third transparent conductive layers comprise layers selected from the group consisting of: a layer of indium tin oxide, a layer of indium zinc oxide, a layer of gallium-doped zinc oxide, a transparent conductive carbon nanotube layer.

14. The display defined in claim 12 wherein the first, second, and third transparent conductive layers comprise indium tin oxide.

15. The display defined in claim 14 wherein the semiconducting layer comprises a semiconducting-oxide layer.

16. The display defined in claim 15 wherein a portion of the first layer forms fingers for the display pixel electrode.

17. A display, comprising:
an array of display pixels, each display pixel having a first transistor that is controlled to apply a data signal from a data line to a region of liquid crystal material using a display pixel electrode and each display pixel having a second transistor that adjusts a capacitance value for a storage capacitor by switching second and third parallel capacitors in and out of use in parallel with a first capacitor, each display pixel in the array comprising:
a first patterned metal layer that forms gates for the first and second transistors and a common electrode;
a semiconducting layer forming channels for the first and second transistors;
a second patterned metal layer that forms at least one source and at least one drain for the first and second transistors; and
transparent conductive layers that form the first, second, and third capacitors.

18. The display defined in claim 17 wherein the transparent conductive layers include first, second, third, and fourth transparent conductive layers.

19. The display defined in claim 18 wherein the first transparent conductive layer and the second transparent conductive layer form respective electrodes for the first capacitor, wherein the second transparent conductive layer and the third transparent conductive layer form respective electrodes for the third capacitor, and wherein the third transparent conductive layer and the fourth transparent conductive layer form respective electrodes for the second capacitor.

20. The display defined in claim 19 wherein the first transparent conductive layer has fingers that form the display pixel electrode and wherein the semiconducting layer comprises a semiconducting-oxide layer.

* * * * *

UNITED STATES PATENT AND TRADEMARK OFFICE
CERTIFICATE OF CORRECTION

Page 1 of 1

PATENT NO. : 9,182,643 B1
APPLICATION NO. : 14/494498
DATED : November 10, 2015
INVENTOR(S) : Zhibing Ge et al.

It is certified that error appears in the above-identified patent and that said Letters Patent is hereby corrected as shown below:

In The Claims

In claim 9, column 13, line 45, delete "material" and insert -- layer --

Signed and Sealed this
Tenth Day of May, 2016

Michelle K. Lee
*Director of the United States Patent and Trademark Office*